US007460008B2

(12) United States Patent
Fennelly

(10) Patent No.: US 7,460,008 B2

(45) Date of Patent: Dec. 2, 2008

(54) PROGRAMMABLE TEMPERATURE COMPENSATED TILT SWITCH AND METHOD OF OPERATION

(76) Inventor: James P. Fennelly, 8 Cowdrey St., Stoneham, MA (US) 02180

( * ) Notice: Subject to any disclaimer, the term of this patent is extended or adjusted under 35 U.S.C. 154(b) by 187 days.

(21) Appl. No.: 11/419,307

(22) Filed: May 19, 2006

(65) Prior Publication Data

US 2007/0268148 A1 Nov. 22, 2007

(51) Int. Cl.
*B60Q 1/00* (2006.01)

(52) U.S. Cl. ........................ 340/440; 340/689; 180/282

(58) Field of Classification Search .................. 340/440
See application file for complete search history.

(56) References Cited

U.S. PATENT DOCUMENTS 3,992,951 A * 11/1976 Erspamer et al. .............. 73/497
4,028,815 A * 6/1977 Buckley et al. .......... 33/366.21
6,397,133 B1 * 5/2002 van der Pol et al. ........... 701/37
6,421,622 B1 * 7/2002 Horton et al. ................. 702/95
6,795,752 B1 * 9/2004 Zhao et al. .................. 700/299
7,181,852 B2 * 2/2007 Bryan ..................... 33/203.18
2004/0194327 A1 * 10/2004 Bryan ..................... 33/203.18
2006/0265178 A1 * 11/2006 Townsend et al. ........... 702/153

* cited by examiner

*Primary Examiner*—George A Bugg
(74) *Attorney, Agent, or Firm*—Houston Eliseeva LLP

(57) ABSTRACT

A tilt switch apparatus has an acceleration sensor or sensors, a temperature sensor, an auto-zero function or switch, a central processing unit (CPU), a memory, a communication port, a current source circuit, a current sink circuit, an alarm output, an input power connection, a power conditioning circuit, a housing, an optional visual tilt, zero, and power indicator. The CPU monitors the temperature sensor and applies correction factors to the acceleration sensor reading to adjust for predetermined variations due to changes in temperature. The tilt angle is determined using the temperature corrected reading of acceleration due to gravity. The alarm output is generated when the measured tilt angle relative to an established reference plane exceeds a programmed threshold angle for greater than a programmed amount of time. The alarm output is discontinued when the tilt angle is reduced below the threshold angle by a programmed hysteresis angle for greater than a programmed amount of time. Optional signal indicators may provide a notice signal when the tilt angle exceeds the programmed threshold angle or some predetermined fraction thereof. Additionally there may be multiple signal indicators, which may indicate which direction, pitch and/or roll, the apparatus is tilting. There may also be a signal indicator which provides notices when the power is applied and when the apparatus is aligned with the reference plane.

17 Claims, 4 Drawing Sheets

1000

| Step | Description |
|---|---|
| **100** | **Main Measurement and Alarm Routine** |
| 101 | Has the apparatus alreay been initialized |
| 102 | No Call initialization routine (Step 200) |
| 103 | Has 1 second passed since the last temperature update? |
| 104 | Yes Call temperture update routine (Step 300) |
| 105 | Read X acceleration |
| 106 | Correct measurement for changes due to temperature |
| 107 | Read from memory or calculate X axis tilt angle corresponding to corrected acceleration measurement |
| 108 | Store measurement for averaging |
| 109 | Have enough measurements been taken to satisfy averaging requirement? |
| 110 | No Continue at step 124 |
| 111 | Yes Calculate average X axis angle |
| 112 | Subtract X axis reference angle from averaged X axis angle |
| 113 | Is X alarm flag set? |
| 114 | Yes Add Hysteresis angle to result |
| 115 | No Add 0 to result |
| 116 | Result greater than X axis threshold angle? |
| 117 | Yes Set X alarm flag |
| 118 | No Clear X alarm flag |
| 119 | Greater than 75% of threshold |
| 120 | Yes Light corresponding X indicator lamp |
| 121 | No Extinguish X indicator lamp |
| 122 | Less than +- 0.025 degree ? |
| 123 | Yes Set X zero flag |
| 124 | No Clear X zero flag |
| 125 | Is the unit comfigured as dual axis ? |
| 126 | No Set Y zero flag |
| 127 | Yes Read Y acceleration |
| 128 | Correct measurement for changes due to temperature |
| 129 | Read from memory or calculate Y axis tilt angle corresponding to corrected acceleration measurement |
| 130 | Store measurment for averaging |
| 131 | Have enough measurements been taken to satisfy averaging requirement? |
| 132 | No Continue at step 102 |
| 133 | Yes Calculate average Y axis angle |
| 134 | Subtract Y axis reference angle from averaged Y axis angle |
| 135 | Is Y alarm flag set? |
| 136 | Yes Add Hsyterisis angle to result |
| 137 | No Add 0 to result |
| 138 | Is the result greater than Y axis threshold angle? |
| 139 | Yes Set Y alarm flag |
| 140 | No Clear Y alarm flag |
| 141 | Greater than 75% of threshold |
| 142 | Yes Light corresponding Y indicator lamp |
| 143 | No Extinguish X indicator lamp |
| 144 | Less than +- 0.025 degree ? |
| 145 | Yes Set Y zero flag |
| 146 | No Clear Y zero flag |
| 147 | Is either X or Y alarm flag set? |
| 148 | Yes Is the unit configured to source current? |
| 149 | Yes Is the unit configure as normally open? |
| 150 | Yes Turn on source driver |
| 151 | No Turn off source driver |
| 152 | N Is the unit configure as normally open? |
| 153 | Yes Turn on sink driver |
| 154 | No Turn off sink driver |

FIG. 3a

154 No Is the unit configured to source current?
155 Y Is the unit configure as normally open?
156 Yes Turn off source driver
157 No Turn on source driver
158 N Is the unit configure as normally open?
159 Yes Turn off sink driver
160 No Turn on sink driver
161 Are both X zero and y zero flags set?
162 Yes Light zero indicator lamp
163 No Clear zero indicator lamp
164 Has the auto zero switch been pressed?
165 No Continue to step 167
166 Yes Call Auto Zero Routine
167 Communication Port Request ?
168 No Restart at step 102
169 Yes Call Parameter adjustment routine
170 Restart at step 101

200 Initialization Routine

201 Read configuration parameters from memory
Normal open or Normal closed
Source or sink
Single or dual axis
X Threshold angle
Y Threshold angle
X Hysteresis angle
Y Hysteresis angle
X Reference plane
Y Reference plane
Time Constant
202 Calculate number of averages required to satisfy time constant
203 Call temperature update routine (Step 300)
204 Return to calling routine

300 Temperature Update Routine

301 Read Temperature Sensor
302 Has temperature changed from last reading ?
303 No Return to calling routine
304 Yes Read from memory or calculate X sensitivity correction factor corresponding to new temperature reading
305 Read from memory or calculate X 0g correction factor corresponding to new temperature reading
306 Dual Axis ?
307 N Return to calling routine
308 Yes Read from memory or calculate Y sensitivity correction factor corresponding to new temp reading
309 Read from memory or calculate Y 0g correction factor corresponding to new temperature reading
310 Return to calling routine

FIG. 3b

400 Parameter Adjustment Routine
401 Send instructions for modifying parameters via the communication port (See FIG. 4 for example of instructions)
402 Monitor communication port for user input
403 Is received command an instruction to exit routine?
404 Yes Return to calling routine
405 No Is the command a valid command?
406 No Return to step 401
407 Yes Send instructions for modifying selected parameter over comm port. (See FIG. 5)
408 Monitor communication port for user input
409 Is entered value valid?
410 Yes Update eeprom with new values
411 Send updated value via communication port
412 No Send "Invalid Entry, try again" via communication port
413 Return to step 409
414 Return to step 402

500 Auto Zero Routine
502 Store temperature corrected average X acceleration measurement as X reference angle in eeprom
503 Dual Axis ?
504 Yes Store temperature corrected average Y acceleration measurement as Y reference angle in eeprom
506 Return to calling routine

FIG. 3c

Welcome to TMD-200 parameter adjustment via serial control.
Type one of the following characters to display or configure parameters
d = display current configuration
a = single or dual axis
h = hysteresis
t = time constant
c = normal open or normal closed
s = source or sink
x = x trip angle
y = y trip angle
q = quit

FIG. 4

Please enter the x trip angle (2.0 - 10.0) follwed by a carrage return.
Format is ##.#<CR>:

FIG. 5

PROGRAMMABLE TEMPERATURE COMPENSATED TILT SWITCH AND METHOD OF OPERATION

BACKGROUND OF THE INVENTION

Tilt switches and sensors are used in various applications including construction equipment to ensure the equipment is not on a dangerous incline.

SUMMARY OF THE INVENTION

In general, according to one aspect, the invention concerns a temperature compensated tilt switch comprising a temperature sensor, an acceleration sensor, and a processing unit coupled to the temperature sensor and acceleration sensor. The processing unit determines tilt with reference to the acceleration sensor, which is compensated with reference to the temperature sensor. The processing unit generates an alarm signal when the compensated tilt exceeds a programmed trip angle.

In general, according to another aspect, the invention concerns a programmable tilt switch comprising an acceleration sensor and a processing unit coupled to the acceleration sensor. The processing unit determines tilt with reference to the acceleration sensor adjusted by a programmed reference plane. The processing unit generates an alarm signal when the adjusted tilt exceeds a programmed trip angle.

The present invention concerns a tilt switch apparatus that in one embodiment comprises an acceleration sensor or sensors, a temperature sensor, an auto-zero input, a central processing unit (CPU), a memory, a communication port, a current source circuit, a current sink circuit, an alarm output, an input power connection, a power conditioning circuit, a housing, an optional visual tilt, zero, and/or power indicators. The CPU monitors the temperature sensor and applies correction factors to the acceleration sensor reading to adjust for predetermined variations due to changes in temperature. The tilt angle is determined using the temperature corrected reading of acceleration due to gravity. The alarm output is generated when the measured tilt angle relative to an established reference plane exceeds the programmed threshold angle for greater than the programmed amount of time. The alarm output is discontinued when the tilt angle is reduced below the threshold angle by a programmed hysteresis angle for greater than the programmed amount of time. A signal indicator may provide a notice signal when the tilt angle exceeds the programmed threshold angle or a predetermined fraction thereof. There may also be a signal indicator that provides notices when the power is applied and when the apparatus is aligned with the reference plane.

In some aspects and in some circumstances the CPU calculates tilt angle relative to the reference plane in one axis (pitch or roll) or two axes (pitch and roll). Additionally, each axis has its own independently programmable threshold angle in some implementations.

In some aspects and in some circumstances, the reference plane is set to the current plane of the apparatus by pressing the auto-zero switch. In the event the auto-zero switch is never pressed the reference plane is set to a default reference plane. In some circumstances the default reference plane will be a horizontal level plane.

In some aspects and in some circumstances the communication port is used to change at least one of the following parameters: threshold angle(s), hysteresis angle(s), time constant(s), and alarm output configuration. Additionally the communication port in some circumstances is a RS-232 port.

In some aspects and in some circumstances the measured tilt angle(s), pitch and/or roll, is averaged to adjust the effective responsiveness (time constant) of the tilt switch. Additionally the number of averages is adjustable via the communication port to generate an effective time constant from approaching 0 seconds (no averaging) to an effective time constant of many seconds. In some circumstances the effective time constant is the same or different for each axis.

In some aspects and in some circumstances the threshold angle(s), pitch and/or roll, are adjusted via the communication port between 0 and 90 arc-degrees.

In some aspects and in some circumstances the hysteresis angle(s), pitch and/or roll, are adjusted via the communication port from 0 to many arc-degrees. In some aspects and in some circumstances the hysteresis angle will be less than the corresponding threshold angle. Additionally in some circumstances the hysteresis angle is the same for both axes.

In some aspects and in some circumstances the alarm output configuration is adjusted via the communication port either to couple the externally applied input voltage to the alarm output (source) or to couple electrical ground to the alarm output (sink). Additionally the alarm output is configured to source or sink when the threshold is exceeded (normal open) or until the threshold is exceeded (normal closed) in some examples.

In some aspects and in some circumstances, the power conditioning circuit converts an applied AC or DC input voltage to a voltage usable by the CPU and other components used in the construction or the tilt switch apparatus. In some circumstances the input voltage is between 9 volts and 60 volts DC. Additionally the power conditioning circuit is used to protect the apparatus from reversing of the polarity or applying a voltage that exceeds a specified input voltage range.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3*a*-3*c* illustrates an operational flow of the system in FIG. 2 according to the aspects of the present invention.

FIG. 4 provides an example of programming instructions provided by the apparatus to the user over the communication port.

FIG. 5 provides an example of specific instructions the apparatus provides the user over the communication port for adjusting a selected parameter.

DETAILED DESCRIPTION OF THE PREFERRED EMBODIMENTS

Figure 1:
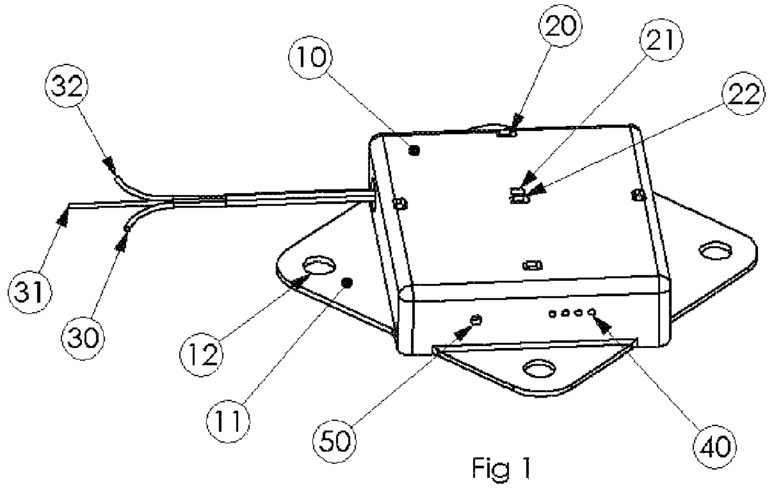
FIG. 1 shows a perspective view of a tilt switch apparatus embodying aspects of the present invention.

FIG. 1 illustrates the programmable temperature compensated tilt switch apparatus including the housing 10, mounting flange 11 with mounting holes 12, electrical ground 30, power 31, and alarm output 32, communication port access holes 40, auto-zero switch access hole 50, optional tilt indicator viewing holes 20, optional zero indicator and power indicator viewing hole 21.

Figure 2:
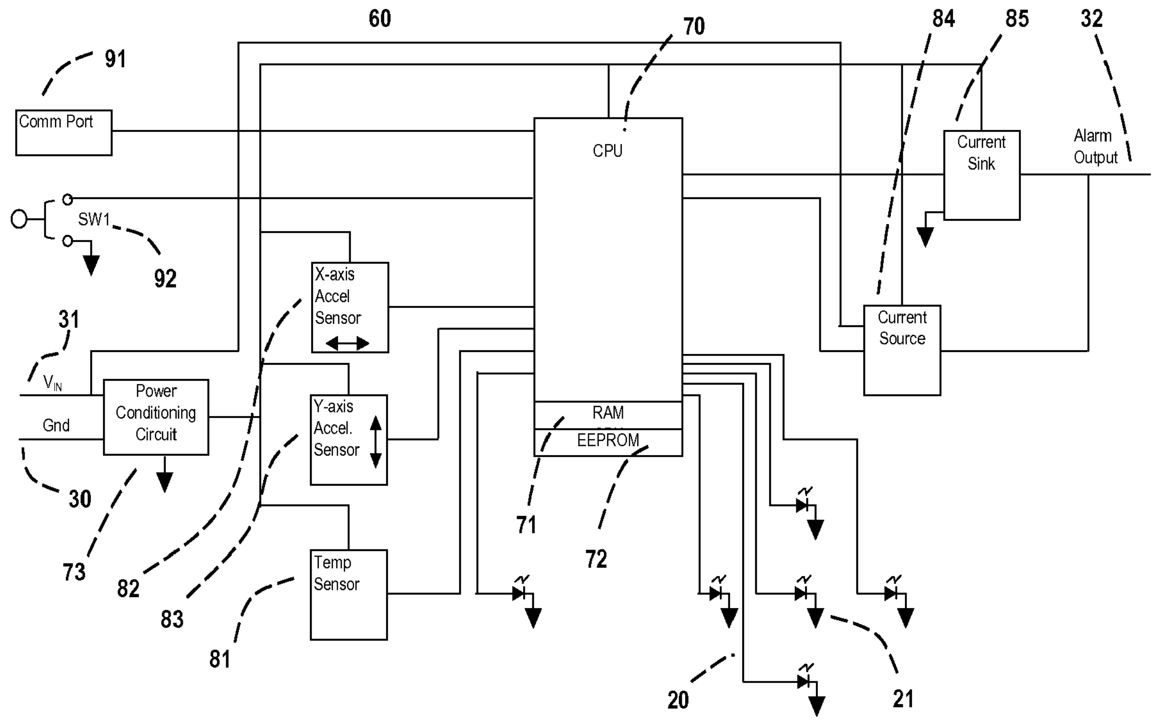
FIG. 2 illustrates a system block diagram of a tilt switch according to the aspects of the present invention.

FIG. 2 illustrates a circuit diagram of the programmable temperature compensated tilt sensor apparatus 60. The circuit includes power conditioning circuit 73, a CPU or processing module 70, coupled to a volatile memory 71 (RAM), a non-volatile programmable memory (EEPROM) 72, a temperature sensor 81, an X-axis acceleration sensor 82, Y-axis acceleration sensor 83, a communication port 91, an auto-zero switch 92, a current source 84, and a current sink 85, which in turn are connected to the alarm output 32.

In some aspects and in some circumstances the temperature sensor 81 and the acceleration sensors 82, 83 are integrated into the same component package. An example of a suitable accelerometer and temperature sensor integrated into the same component package includes the MXD2020EL—dual axis accelerometer, made by MEMSIC Inc. of North Andover, Mass.

The power conditioning circuit 73 converts the voltage applied to the apparatus via the power connection 31 and the ground connection 30 to a voltage and current usable by the apparatus circuitry. In some instances and in some circumstances the applied voltage is between 9 volts and 60 volts and the converted voltage is between 2.5 volts and 6 volts.

The CPU 70 monitors the acceleration sensor(s) 82, 83 and the periodically monitors the temperature sensor 81. In some aspects and is some circumstances the periodicity of the temperature sensor monitoring is about once a second. The CPU 70 applies predetermined temperature dependant acceleration correction factors that are either stored in memory 72 or calculated based on the current temperature reading to the acceleration reading. The CPU 70 uses the corrected acceleration measurement to determine the absolute tilt of the apparatus in one or two axes with respect to a plane horizontal to the earth either by calculation or accessing a lookup table in memory 72. The CPU 70 subtracts a reference angle(s) for either one or two axes from the determined absolute tilt angle(s) to determine the tilt of the apparatus relative to its reference plane stored in non-volatile memory 72. The CPU 70 compares the relative tilt to the X-axis and/or Y-axis threshold (trip) angle(s) stored in non-volatile memory 72. The CPU 70 averages the relative tilt angle(s) for an amount of time determined by the time constant stored in non-volatile memory 72. If the average relative tilt angle(s) exceeds the trip angle(s) the CPU 70 determines an alarm condition exists.

Optionally the CPU 70 provides visual warnings that the tilt angle has exceeded a significant percentage of the trip angle(s) by lighting optional warning LED(s) 20. In some instances and some circumstances the warning is lighted when the tilt angle exceeds 75 percent of the trip angle(s). Additionally the warning LED(s) 20 is arranged in such a fashion as to inform an observer as to which way the apparatus is being tilted.

The CPU 70 is connected to and controls a current source 84 and a current sink 85, which are both connected to the alarm output 32. When the CPU 70 determines an alarm condition exists it generates an alarm output 32 per the configuration stored in non-volatile memory (EEPROM) 72. The alarm output 32 is configured to source current (source) or sink current (sink) either while an alarm condition exists (normal open) or while no alarm condition exists (normal closed). There are four different configurations possible: (1) normal open, source; (2) normal open, sink; (3) normal closed, source, (4) normal closed, sink. For example consider the apparatus with the alarm output 32 configured to be normal closed, source. While the alarm condition does not exist, the alarm output 32 is sourcing current. When the apparatus is tilted such that an alarm condition exists, the alarm output 32 discontinues sourcing current.

Once an alarm condition has occurred it is continued until the average relative tilt angle(s) falls below the threshold angle(s) by the hysteresis angle(s) stored in non-volatile memory 72.

FIG. 2 also illustrates an auto-zero input switch 92 and a communication port 91 both coupled to the CPU 70. In some instances and is some circumstances the auto-zero input is provided by a user closing a momentary auto-zero input switch 92 or through the communication port 91. If an auto-zero request is made either by the auto-zero switch or the communication port 91, the CPU 70 stores the current average absolute angle(s) as the reference angle(s) in EEPROM 72. This newly stored angle(s) is now used as the reference angle(s) until a new auto-zero request is made.

The CPU 70 monitors the communication port 91 for any attempted communication. If an external device, such as a computer connected via an RS-232 cable, initiates communication over the communication port 91, the apparatus enters a programmable mode of operation (program mode). While in program mode the apparatus can be reconfigured. Parameters that are programmed in this mode include but are not limited to: the reference plane, X-axis threshold (trip) angle; X-axis hysteresis angle; Y-axis trip angle; Y-axis hysteresis angle; Time constant (delay); alarm configuration of normally open or normally closed, and source or sink current.

Upon entering program mode the CPU 70 halts measurement operation, sends instructions for modifying the apparatus configuration parameters then continuously monitors the communication port 91 and responds to requests.

FIG. 4 illustrates an example of instructions provided by the apparatus via the communication port 91. If a valid command as detailed in FIG. 4 is received the CPU 70 provides additional instructions for adjusting the parameter. FIG. 5 illustrates and example of the instructions the apparatus may provide if the command “x” were issued to the communication port 91. The CPU 70 continues to monitor the communication port 91 waiting for the value to be entered for the parameter being programmed. Once the value has been received, the CPU 70 checks to see if it is a valid value. If the value is valid, the CPU 70 writes the new value into EEPROM 72 and sends the value over the communication port 91 to tell the user what the value was updated to. It then resumes monitoring the communication port 91 waiting for the next command. If the value is invalid the CPU 70 informs the user that they have entered an invalid value and instructs them to re-enter a valid value. This continues until the command to quit is received.

Upon receiving the command to quit the CPU 70 exits program mode and resumes normal operation using the updated stored parameters for operation.

FIGS. 3*a*, 3*b*, 3*c* illustrate an operational flow 1000 of the apparatus circuitry 60.

With reference to FIG. 3*a*, upon power being applied, the CPU 70 begins executing the main measurement routine 100. The main measurement routine immediately determines if the apparatus has been initialized yet or if it was just powered on.

If it was just powered on, it calls the initialization routine 200 shown in FIG. 3*b*. In the initialization routine 200 the CPU 70 reads from EEPROM 72 the stored configuration parameters for operation. These parameters may include but are not limited to: X-axis reference angle; X-axis threshold (trip) angle; X-axis hysteresis angle; Y-axis reference angle; Y-axis threshold (trip) angle; Y-axis hysteresis angle; time constant (delay); alarm configuration of normally open or normally closed, and sourcing current or sinking current. Returning from the initialization routine 200 the CPU 70 calls the temperature update routine 300. In the temperature update routine the CPU 70 reads the temperature sensor 81 and compares the value to the last temperature reading. If the temperature reading has not changed from the last temperature reading the routine instructs the CPU 70 to return to executing the main routine 100. If the temperature reading has changed the CPU 70 calculates or retrieves from EEPROM 72 new acceleration temperature correction factors which it uses to correct temperature dependencies of the acceleration sensor(s) 82 83. Execution is then returned to the main measurement routine 100.

At step 105 106 107 in FIG. 3*a*, the CPU 70 reads the X-axis acceleration sensor, corrects the measurement for predetermined temperature dependencies and calculates or looks up in memory 72 the absolute tilt angle corresponding to the corrected acceleration measurement. The corrected measurement is stored in RAM 71 for averaging with preceding and subsequent X-axis tilt angle measurements. If enough measurements have not been made to fulfill the time constant requirements execution continues at step 125. If enough measurements have been made the CPU 70 averages the measured X-axis tilt angles stored in RAM 71 to determine the average absolute X-axis tilt of the apparatus. At step 112 the CPU 70 checks to see if an X-axis alarm condition previously existed. If it did the X-axis hysteresis angle is added to the result, otherwise nothing is added. The CPU 70 then subtracts the stored X-axis reference angle from the result and compares it to the X-axis trip angle retrieved earlier from EEPROM 72. If the resultant angle is greater than the trip angle the CPU 70 sets the X-axis alarm flag. If the resultant angle is less than the trip angle, it clears the X-axis alarm flag and optionally lights the warning indicator LED(s) 21 if the result is greater than a warning threshold which is a predetermined percentage of the trip angle.

Continuing at step 125 the CPU 70 checks the apparatus configuration to determine if it is a single axis or dual axis configuration. If it is a single axis configuration, flow continues at step 147. Otherwise the apparatus is determined to be a dual axis device and measurement of the Y-axis commences at step 127. The CPU 70 reads the Y-axis acceleration sensor, corrects the measurement for predetermined temperature dependencies and calculates or looks up in memory 72 the absolute tilt angle corresponding to the corrected acceleration measurement. The corrected measurement is stored in RAM 71 for averaging with preceding and subsequent Y-axis tilt angle measurements. If enough measurements have not been made to fulfill the time constant requirements determined by the time constant execution loops back to step 103. If enough measurements have been made the CPU 70 averages the measured Y-axis tilt angles stored in RAM 71 to determine the average absolute Y-axis tilt of the apparatus. At step 135 the CPU 70 checks to see if a Y-axis alarm condition previously existed. If it did the Y-axis hysteresis angle is added to the result, otherwise nothing is added. The CPU 70 then subtracts the stored Y-axis reference angle from the result and compares it to the Y-axis trip angle retrieved earlier from EEPROM 72. If the resultant angle is greater than the trip angle the CPU 70 sets the Y-axis alarm flag. If the resultant angle is less than the trip angle it clears the Y-axis alarm flag and optionally lights the warning indicator LED(s) 20 if the result is greater than a warning threshold which is a predetermined percentage of the trip angle.

At this point the apparatus has made enough measurements to fulfill the averaging requirements set by the time constant and execution continues at step 147. The CPU 70 checks to see if either alarm flag (X or Y) have been set at either step 117 or 139. If so, the CPU 70 generates the alarm output by checking the configuration as to be normal open or normal closed and source or sink (steps 148-154). If neither flag is set the CPU 70 clears the alarm output and determines if the optional zero indicator LED 21 should be lit (steps 155-164).

Now the CPU 70 checks to see if the auto-zero switch 92 has been pressed making an auto-zero request. If an auto-zero request was made the auto-zero routine 500 is called. The auto-zero routine 500 stores the current temperature corrected X-axis tilt angle as the reference angle and if the apparatus is configured to be dual axes it also stores the current temperature corrected Y-axis tilt angle as the reference angle. The routine then returns to step 167 where the CPU 70 checks to see if communication via the communication port 91 has been attempted. If no communication was attempted execution continues at step 103 where the process loop starts again. If communication was attempted the Parameter adjustment routine 400 is called thereby entering program mode of operation.

In FIG. 3*c*, at step 401 the CPU 70 sends an instruction for modifying the apparatus configuration parameters over the communication port 91. An example of the instructions sent over the communication port 91 is illustrated in FIG. 4. After the instructions are sent the CPU 70 continuously monitors the communication port 91 for commands. Once a command is received, the CPU 70 checks to see if it is a "quit" command at step 403. If it is a "quit" command execution is returned to the main measurement routine 100 at step 171 where the main measurement routine loops back to step 102 and the apparatus loop begins again. If it is not a "quit" command step 405 checks to see if it is a valid command and execution resumes at step 401 if it is not, where instructions for changing the configuration parameters are again sent over the communication port 91. Additional instructions for modifying the selected parameter are sent over the communication port 91 if a valid command was received (step 407). An example of the additional instructions sent if the command received was an "x" as detailed in FIG. 4 can be seen in FIG. 5.

The CPU 70 now monitors the communication port 91 and waits for a value to be received. Once a value is received the CPU 70 checks at step 409 to see if it is a valid value for the parameter being modified. If not the CPU 70 sends "Invalid Entry, try again", and resumes execution at step 408. Once a valid entry is received step 410 is executed where the value is written into EEPROM 72 and now becomes the parameter for future operation until it is updated again via this same routine. The CPU 70 sends the value back over the communication port 91 so that the user can verify that it has been updated to the correct value. This routine continues until a quit command is received or power is removed from the device.

When the quit command is received the execution is returned to step 171, which in turn loops back to step 102 and the apparatus begins again as if it were just powered on so that all the updated parameters are read from EEPROM 72 and are used for operation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A tilt switch comprising:

a temperature sensor;

an acceleration sensor;

a processing unit coupled to the temperature sensor and acceleration sensor, for determining tilt with reference to the acceleration sensor, which is compensated with reference to the temperature sensor, the processing unit generating an alarm signal when the compensated tilt exceeds a programmed trip angle;

wherein a signal provided by an auto-zero input causes the processing unit to store a current plane of the apparatus into non-volatile memory to be used as a reference plane.

2. The tilt switch of claim 1 wherein the programmed trip angle is referenced to a plane stored in non-volatile memory.

3. The tilt switch of claim 1, wherein the processing unit periodically reads the temperature sensor and corrects acceleration sensor measurements for pre-determined temperature dependencies of the acceleration sensor.

4. The tilt switch of claim 1, where a period of time between subsequent temperature measurements is about 1 second.

5. A tilt switch comprising:

a temperature sensor;

an acceleration sensor;

a processing unit coupled to the temperature sensor and acceleration sensor, for determining tilt with reference to the acceleration sensor, which is compensated with reference to the temperature sensor, the processing unit generating an alarm signal when the compensated tilt exceeds a programmed trip angle;

wherein the processing unit averages determined tilt, the length of the average being stored in non-volatile memory.

6. The tilt switch of claim 1 wherein the trip angle is programmable.

7. A tilt switch comprising:

a temperature sensor;

an acceleration sensor;

a processing unit coupled to the temperature sensor and acceleration sensor, for determining tilt with reference to the acceleration sensor, which is compensated with reference to the temperature sensor, the processing unit generating an alarm signal when the compensated tilt exceeds a programmed trip angle;

wherein once an alarm signal is provided it is maintained until the tilt falls below the trip angle by a hysteresis angle.

8. The tilt switch of claim 7 wherein the hysteresis angle is programmable.

9. A tilt switch comprising:

a temperature sensor;

an acceleration sensor;

a processing unit coupled to the temperature sensor and acceleration sensor, for determining tilt with reference to the acceleration sensor, which is compensated with reference to the temperature sensor, the processing unit generating an alarm signal when the compensated tilt exceeds a programmed trip angle;

wherein the alarm signal is configured to be one of:

source current during alarm condition;

sink current during an alarm condition;

source current while no alarm condition is present;

sink current while no alarm condition is present.

10. The tilt switch of claim 7 wherein a signal provided by an auto-zero input causes the processing unit to store a current plane of the apparatus into non-volatile memory to be used as a reference plane.

11. A programmable tilt switch comprising:

an acceleration sensor;

a processing unit coupled to the acceleration sensor, for determining tilt with reference to the acceleration sensor adjusted by a programmed reference plane, the processing unit generating an alarm signal when the adjusted tilt exceeds a programmed trip angle;

wherein once an alarm signal is provided it is maintained until the tilt falls below the trip angle by a hysteresis angle.

12. The tilt switch of claim 11 wherein the processing unit averages determined tilt, the length of the average being stored in non-volatile memory.

13. The tilt switch of claim 11 wherein the trip angle is programmable.

14. A programmable tilt switch comprising:

an acceleration sensor;

a processing unit coupled to the acceleration sensor, for determining tilt with reference to the acceleration sensor adjusted by a programmed reference plane, the processing unit generating an alarm signal when the adjusted tilt exceeds a programmed trip angle;

wherein once an alarm signal is provided it is maintained until the tilt falls below the trip angle by a hysteresis angle.

15. The tilt switch of claim 14 wherein the hysteresis angle is programmable.

16. A programmable tilt switch comprising:

an acceleration sensor;

a processing unit coupled to the acceleration sensor, for determining tilt with reference to the acceleration sensor adjusted by a programmed reference plane, the processing unit generating an alarm signal when the adjusted tilt exceeds a programmed trip angle;

wherein the alarm signal is configured to be one of:

source current during alarm condition;

sink current during an alarm condition;

source current while no alarm condition is present;

sink current while no alarm condition is present.

17. A programmable tilt switch comprising:

an acceleration sensor;

a processing unit coupled to the acceleration sensor, for determining tilt with reference to the acceleration sensor adjusted by a programmed reference plane, the processing unit generating an alarm signal when the adjusted tilt exceeds a programmed trip angle;

wherein a signal provided by an auto-zero input causes the processing unit to store a current plane of the apparatus into non-volatile memory to be used as the programmed reference plane.

* * * * *

UNITED STATES PATENT AND TRADEMARK OFFICE

CERTIFICATE OF CORRECTION

PATENT NO. : 7,460,008 B2
APPLICATION NO. : 11/419307
DATED : December 2, 2008
INVENTOR(S) : James P. Fennelly It is certified that error appears in the above-identified patent and that said Letters Patent is hereby corrected as shown below:

In Claim 12, column 8, line 20, delete “The tilt switch of claim 11” and insert --The tilt switch of claim 14--.

Signed and Sealed this

Twenty-fourth Day of February, 2009

JOHN DOLL
*Acting Director of the United States Patent and Trademark Office*